United States Patent
Reed

(10) Patent No.: US 7,672,923 B1
(45) Date of Patent: Mar. 2, 2010

(54) GRID NETWORK MANAGEMENT VIA AUTOMATIC TREND ANALYSIS OF A SERVICE LEVEL AGREEMENT

(75) Inventor: David Reed, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 368 days.

(21) Appl. No.: 11/591,082

(22) Filed: Oct. 31, 2006

(51) Int. Cl.
G06F 15/18 (2006.01)
(52) U.S. Cl. .......................................................... 706/50
(58) Field of Classification Search ........................ None
See application file for complete search history.

(56) References Cited

U.S. PATENT DOCUMENTS

| | | | | |
|---|---|---|---|---|
| 7,340,522 | B1 * | 3/2008 | Basu et al. ................... | 709/226 |
| 2004/0167980 | A1 * | 8/2004 | Doyle et al. ................. | 709/225 |
| 2004/0225629 | A1 * | 11/2004 | Eder ............................ | 706/46 |
| 2006/0165040 | A1 * | 7/2006 | Rathod et al. ............... | 370/335 |
| 2006/0277305 | A1 * | 12/2006 | Bernardin et al. ........... | 709/226 |
| 2007/0240161 | A1 * | 10/2007 | Prabhakar et al. ........... | 718/104 |

OTHER PUBLICATIONS

Job Monitoring in Interactive Grid Analysis Environment Author(s) Anjum, A (CERN); Ali, A ; Newman, H ; Willers, I (CERN); Bunn, J ; Thomas, M ; McClatchey, R ; Rehman, W ; Cavanaugh, R J ; Van lingen, F ; Steenberg, C In: Computing in High Energy Physics and Nuclear Physics 2004, Interlaken, Switzerland, Sep. 27-Oct. 1, 2004, pp. 746.*

An Implementation of Interactive Jobs Submission for Grid Computing Portals, Xiao Haili, Wu Hong, Chi Xuebin, Deng Sungen, Zhang Honghai, Australiasian Workshop on Grid Computing and e-Research, Conferences in Research and Practice in Information Technology vol. 44 pp. 1-4.*

GridSim: a toolkit for themodeling and simulation of distributed resource management and scheduling for Grid computing Rajkumar Buyya and Manzur Murshed, Concurrency and Computation: Practice and Experience Concurrercy Cornputat.: Pract. Exper: 2002; 14: 1 175-1220 (DOI: 10.100Ucpe.7 10).*

* cited by examiner

*Primary Examiner*—David R Vincent
*Assistant Examiner*—Ola Olude-Afolabi

(57) ABSTRACT

A method for managing a GRID network. The method includes performing trend analysis of a job type repeatedly processed by the GRID network to anticipate a future load on the GRID network associated with the job type. The job type is associated with a service level agreement (SLA). At least one internal performance metric of the GRID network is measured to monitor current GRID network status. The future load that is anticipated is compared with the at least one performance metric to predict future satisfaction of the SLA.

17 Claims, 3 Drawing Sheets

GRID NETWORK MANAGEMENT VIA AUTOMATIC TREND ANALYSIS OF A SERVICE LEVEL AGREEMENT

BACKGROUND ART

GRID computing is a method of harnessing the power of many computational resources in a network. GRID computing involves large scale geographically distributed heterogeneous resources, and involves resource sharing by applications and/or high performance processing and network bandwidth. As such, a GRID computing environment or network enables sharing of loosely coupled resources and services required by various applications in a large-scale environment.

Traditionally, GRID computing has provided for the execution of batch jobs in the scientific and academic community. Batch execution on a grid computing environment requires authentication, authorization, resource access, resource discovery, and other services. In support of batch processing of jobs on a grid computing environment, protocols, services, application programming interfaces, and software development kits have been developed.

However, although specifications such as Open Grid Service Infrastructure (OGSI) provide for the basic functionalities of a GRID network, these specifications do not provide sufficient detail in the management of quality of service provided to the client within the GRID network. Experience shows that query times in single instance data bases can vary over several orders of magnitude depending no a large number of factors. In a distributed database environment, this problem is further exacerbated. Moreover, within the traditional GRID network implementing a distributed database environment, it is difficult to determine or commit to a defined level of performance. For instance, the conventional GRID network includes one layer of job scheduling software which is unaware of the current state of the resources in the GRID network. This confines the GRID network to processing specialized computing applications with dedicated machines instead of a distributed model.

BRIEF DESCRIPTION OF THE DRAWINGS

The above and other objects and advantages of the present invention will be more readily appreciated from the following detailed description when read in conjunction with the accompanying drawings.

DETAILED DESCRIPTION OF THE INVENTION

Figure 1:
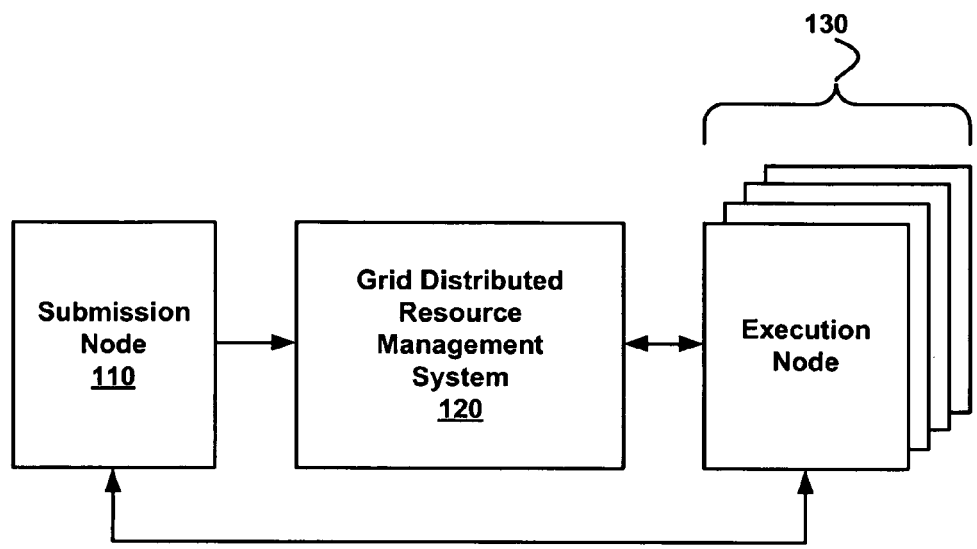
FIG. 1 illustrates a data flow diagram is shown illustrating the implementation of an exemplary GRID network 100, in accordance with one embodiment of the present invention.

Reference will now be made in detail to embodiments of the present invention, a method and system for managing a GRID network, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Accordingly, various embodiments of the present invention disclose methods and systems for performing predictive behavioral modeling of the GRID network to satisfy service level agreements (SLAs) associated with clients using the GRID network. Other embodiments of the present invention provide for the above accomplishments and also provides standard metric via established test jobs and real jobs to measure performance and simultaneously gather environmental data of the GRID network that is stored in a metadata repository. Performance profiles are built over time to create predictable service levels under a variety of loads in order to satisfy SLAs.

Notation and Nomenclature

Embodiments of the present invention can be implemented on software running on a computer system in conjunction with an optical imaging system. The computer system can be a personal computer, notebook computer, server computer, mainframe, networked computer, workstation, and the like. This software program is operable for providing offset vectors used in determining the alignment of two or more material layers. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "processing," "measuring," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Referring now to FIG. 1, a data flow diagram is shown illustrating the implementation of an exemplary GRID network 100, in accordance with one embodiment of the present invention. GRID network 100 consists of a plurality of heterogeneous execution nodes 130 distributed across multiple administrative domains. That is, the plurality of heterogeneous execution nodes reside in remote locations that are coupled together through a communication network, such as, the Internet. The plurality of heterogeneous execution nodes 130 can be configured in any type of formation, for example, a plurality of clusters of nodes. The plurality of execution nodes 130 is managed by a grid distributed resource management (DRM) system 220.

In one embodiment, the plurality of heterogeneous execution nodes 130 are distributed across multiple administrative domains. A client may access remote nodes either in the same administrative domain, or across domains. In particular, in the data flow diagram of FIG. 1, an end-user, or client, submits a job request for execution to the GRID DRM through a submission node 110. For example, the job request may access a database (e.g., relational database, object oriented relational database, etc) that is distributed on one or nodes throughout GRID network 100. On receiving the job request from the client, the GRID DRM selects one or more remote execution nodes in the plurality of heterogeneous execution nodes 130 for processing the job request.

Figure 2:
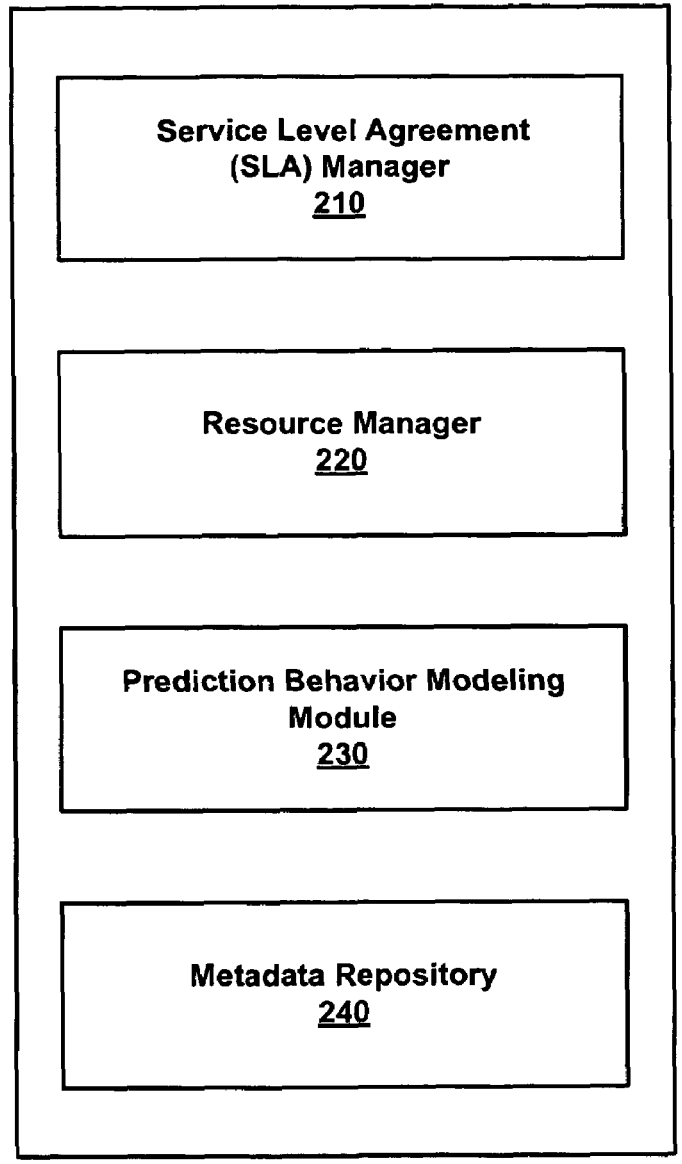
FIG. 2 is a block diagram of a system 200 that is capable of performing predictive behavioral modeling of the GRID network to satisfy SLAs associated with clients using the GRID network, in accordance with one embodiment of the present invention.

FIG. 2 is a block diagram of a system 200 that is capable of performing predictive behavioral modeling of the GRID network to satisfy SLAs associated with clients using the GRID network, in accordance with one embodiment of the present invention. In one embodiment the functionalities of system 200 is included within GRID DRM 120 of FIG. 1. In another embodiment, system 200 is separate from GRID DRM 120.

As shown in FIG. 2, system 200 includes an SLA manager 210 for performing trend analysis. SLA manager 210 performs trend analysis of a plurality of jobs of a particular job type that is repeatedly processed by the GRID network. For instance, a client may repeatedly submit jobs of a particular job type for execution in GRID network 100. As previously described, the job type may be associated with accessing a database (e.g., relational database, object oriented relational database, etc) that is distributed GRID network 100.

Additionally, an SLA can be associated with execution of the job type for a client. The SLA is associated with GRID network performance in handling execution of the plurality of jobs associated with the job type. In one embodiment, the job type includes test jobs that are submitted by SLA manager. In another embodiment, the job type includes real jobs submitted for processing by GRID network 100. For instance, an SLA can represent expectations and responsibilities of different parties involved about the functionality and performance of GRID network 100 in handling execution of the plurality of jobs associated with the job type handled by a particular client.

In particular, SLA manager 210 monitors external performance metrics related to the submission and execution of the plurality of jobs. For example, in one embodiment, the performance metric is related to the time taken by GRID network 100 to process each job associated with the job type. In particular, a return time is monitored and recorded for processing each of the plurality of jobs.

Trend analysis of the execution of the plurality of jobs is performed. In this manner, the present embodiment is capable of anticipating at least one future load on the GRID network that is associated with execution of the job type handled by the client. The future load defines anticipated load conditions on the GRID network related to the processing of the plurality of jobs associated with the job type handled by the client. As such, the present embodiment is capable of tracking load conditions placed on GRID network 100 and predicting or anticipating future load conditions.

In embodiments of the present invention, any conventional technique for performing trend analysis is implemented to determine trends associated with the submission of the plurality of jobs associated with the job type handled by the client. For example, processes performed in the area of data mining can be employed to perform trend analysis of the access of a database distributed throughout GRID network 100.

In one embodiment, SLA manager 210 designs the test jobs for submission to GRID network 100. That is, SLA manager 210 defines the configuration and parameters of performance metrics associated with the test jobs. Execution of the test jobs provides characterizations of GRID system 100 under various load conditions in a controlled environment.

In another embodiment, SLA manager 210 is able to provide reporting whether GRID network 100 satisfies the SLA. That is, SLA manager 210 provides performance reports by gathering each of the SLAs, associated each SLA with a client, and a particular job type, and reporting the performance metrics related to each of the SLAs under various load conditions over a time period.

The system 200 also includes at least one resource manager 220 for monitoring past and current status of GRID network 100. In particular, a history of performance metrics is established for GRID network 100. In particular, resource manager 220 measures at least one internal performance metric of a node (e.g., computing resource, server, memory storage, router, etc.) of GRID network 100. The performance metrics include, but are not limited to, throughput, resource utilization, storage capacity, storage availability, etc.

In addition, system 200 includes a predictive behavior modeling module 230 for comparing any future load that is anticipated and at least one internal performance metric to predict satisfaction of the SLA associated with the client. That is, given the current conditions or status of GRID network 100, and considering any anticipated load conditions related to executing of jobs associated with the job type handled by the client, the present embodiment is able to predict whether the SLA associated with the client can be satisfied at some time in the future.

In particular, predictive behavior modeling module 230 includes a profile builder 235 that is capable of determining predictable service levels under various load conditions. As such, profile builder 235 is capable of generating a plurality of profiles that predict satisfaction of the SLA under various load conditions, as predicted by the anticipated load conditions, that are presented to GRID network 100.

As such, based on the predictive modeling, the system 200 can determine a proper course of action to ensure satisfaction of the SLA. In particular, system 200 includes an action analyzer (not shown) that determines an action to implement based on whether said SLA is satisfied under any anticipated future load.

For example, under one exemplary scenario, access of a distributed database may be instituted through one node of GRID network 100. That is, under current load condition, the associated SLA is satisfied even though the database is distributed across one node of GRID network 100. However, if predictive behavior modeling module 230 anticipates heavier load conditions, indicating an increase of job requests related to the SLA, the present embodiment is able to distribute the database across multiple nodes in order to provide increased access to the distributed database. Redistribution of the database may occur during period of lesser activity on GRID network 100 as predicted by the predictive behavior modeling module 230. Also, the distributed database may be duplicated across multiple nodes in GRID network 100 to provide additional access avenues to the database.

In addition, system 200 includes a metadata repository 240 for storing results from the trend analysis preformed by SLA manager and performance metrics monitored by resource manager 220. In particular, metadata repository 240 keeps records of metric job performance data determined by SLA manager 210 and resource manager 220, metric job configuration and parameters, current system status determined by resource manager 220, GRID resource library, and performance reporting.

Figure 3:
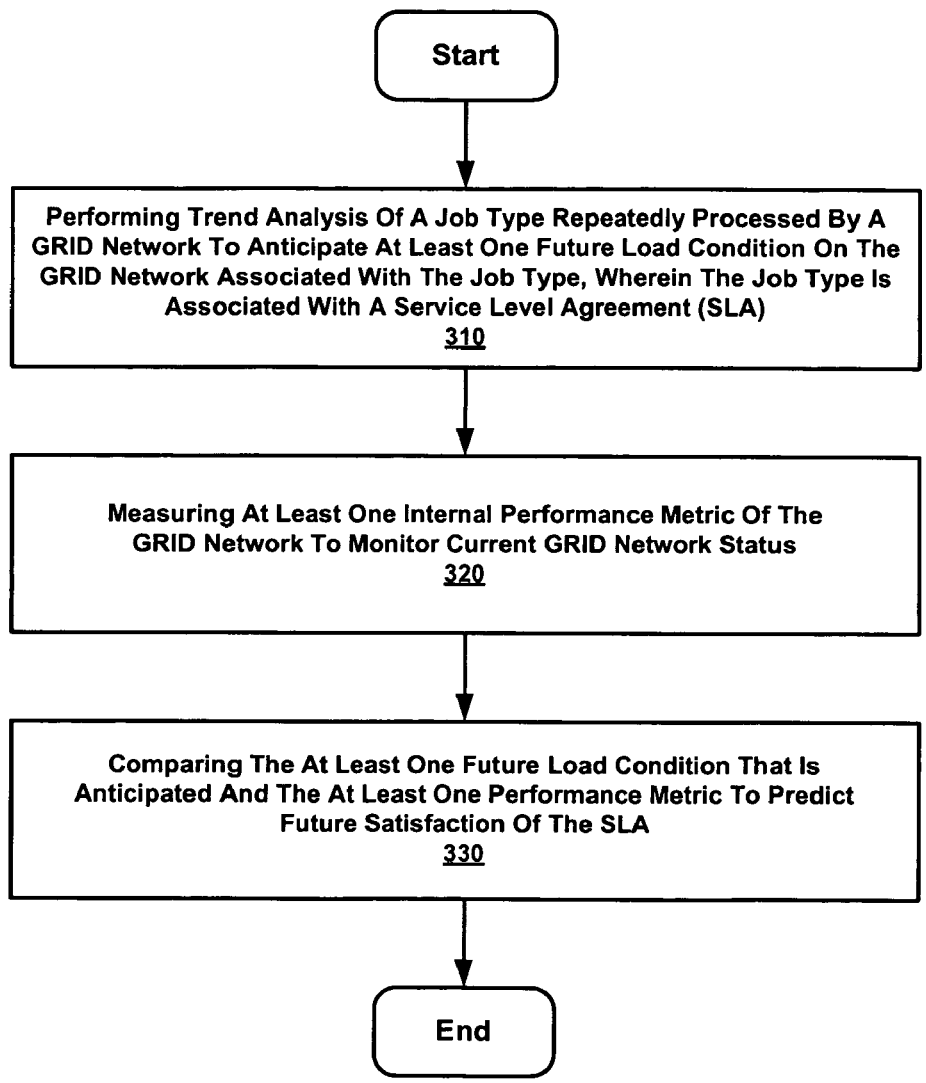
FIG. 3 is a flow diagram 300 illustrating steps in a method for managing a GRID network, in accordance with one embodiment of the present invention.

FIG. 3 is a flow diagram 300 illustrating steps in a method for managing a GRID network, in accordance with one embodiment of the present invention. Flow diagram 300 is implemented by system 200 in one embodiment for managing resources in GRID network 100 to satisfy an SLA.

At 310, the present embodiment performs trend analysis of a job type repeatedly processed by the GRID network. Specifically, SLA manager 210 performs the trend analysis. As such, SLA manager 210 is able to anticipate at least one future load condition on GRID network 100. The at least one future load condition is associated with submissions of the job type for processing by GRID network 100. The job type is associated with a particular SLA of a particular client. For example, the SLA is designed to establish thresholds of performance metrics to be met when processing jobs of a job type that is processed in GRID network 100.

In particular, the present embodiment processes a plurality of jobs that are associated with the job type. In addition, a performance history is determined when processing the plurality of jobs. In this manner, GRID network 100 can be characterized using performance metrics under various load conditions. In addition, load conditions on GRID network 100 can also be characterized, wherein the load conditions are associated with the client, the SLA, and execution of jobs associated with the job type.

For example, the present embodiment is able to provide standard metrics via established jobs that measure performance of GRID network 100. In particular, the present embodiment submits and processes at least one test job in the GRID network. The test job is used for controlled testing of GRID network 100. In one embodiment, the job type comprises the test job. That is, the test job is able to closely simulate real jobs that the client submits and processes using GRID network 100.

In addition, the present embodiment measures an external performance metric of GRID network 100 that is associated with processing of the test job. In one embodiment, the external performance metric comprises a return time for executing each of the test jobs. In this manner, the set of test programs that are submitted and processed by GRID network 100 capture performance metrics that characterize performance of GRID network 100 under various simulated and actual load conditions.

Also, the present embodiment is able to provide standard metrics via real jobs that are submitted by the client for processing in GRID network 100. The standard metrics measure performance of GRID network 100. For example, an external performance metric comprising a return time for executing the real jobs is monitored. The job type also comprises the real job, and as such, performance metrics gathered when processing the real jobs provide actual characterizations of the performance of GRID network under various load conditions.

At 320, the present embodiment measures at least one internal performance metric of the GRID network to monitor current and past status of GRID network 100. That is, the at least one resource manager 220 is able to simultaneously gather GRID environmental data. In particular, the internal performance metrics are associated with a node of GRID network 100. The internal performance metrics include, but are not limited to, the following: throughput, memory capacity, resource utilization, etc.

At 330, the present embodiment compares the at least one future load condition that is anticipated and the at least one performance metric. In particular, predictive behavior modeling module 330 is able to predict satisfaction of the SLA under the current and anticipated load conditions of GRID network 100.

As a result, the present embodiment is able to determine an action based on whether the SLA is satisfied under the anticipated future load condition. The present embodiment is also capable of performing the action. For example, GRID DRM 120 is able to reconfigure GRID network 100 to satisfy the SLA in the most efficient manner. For instance, the action may include the re-allocation of resources in GRID network 100 for processing the plurality of jobs of a job type handled by the client. The job type is associated with a particular SLA. In one case, resources are acquired in anticipation of an increase of load conditions. In another case, resources are removed in anticipation in a decline in load conditions. In another instance, the action comprises a redistribution of data throughout GRID network 100 to satisfy SLA requirements as dictated by the anticipated load conditions.

Accordingly, various embodiments of the present invention disclose methods and systems for performing predictive behavioral modeling of the GRID network to satisfy service level agreements (SLAs) associated with clients using the GRID network. Other embodiments of the present invention provide for the above accomplishments and also provides standard metric via established test jobs and real jobs to measure performance and simultaneously gather environmental data of the GRID network that is stored in a metadata repository. Performance profiles are built over time to create predictable service levels under a variety of loads in order to satisfy SLAs. Still other embodiments of the present invention provide the above accomplishments and allow clients to define the SLAs they require in terms of controlled test conditions. This allows for a closer relationship between client requirements and actual and predicated load conditions of a GRID network. This makes the GRID network commercially viable for mission critical applications without the need for dedicated systems.

While the methods of embodiments illustrated in flow chart 3 show specific sequences and quantity of operations, the present invention is suitable to alternative embodiments. For example, not all the operations provided for in the methods presented above are required for the present invention. Furthermore, additional operations can be added to the operations presented in the present embodiments. Likewise, the sequences of operations can be modified depending upon the application.

A method and system for performing predictive behavioral modeling of a GRID network is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A method for managing a grid network, comprising:
   automatically performing trend analysis of a job type repeatedly processed by said grid network to anticipate at least one future load condition on said grid network associated with said job type, wherein said job type is associated with a service level agreement (SLA), wherein said performing of said trend analysis comprises:
   processing a client defined test job, associated with said job type, in said grid network, wherein said test job is used for controlled testing of a performance of said grid network; and
   measuring an external performance metric of said grid network that is associated with said processing of said test job;
   automatically measuring at least one internal performance metric of said grid network to monitor current grid network status; and
   automatically predicting future satisfaction of said SLA by comparing said at least one future load condition that is anticipated and said at least one internal performance metric.

2. The method of claim 1, further comprising:
   determining an action to be automatically performed by said grid network based on whether said SLA is satisfied under said at least one future load condition.

3. The method of claim 2, further comprising:
   performing said action.

4. The method of claim 2, wherein said determining of said action comprises:
   determining said action, wherein said action comprises a redistribution of data associated with said test job throughout said grid network.

5. The method of claim 2, wherein said determining of said action comprises:
   determining said action, wherein said action comprises re-allocating resources in said grid network assigned to jobs associated with said SLA.

6. The method of claim 1, wherein said measuring of said external performance metric comprises:
   measuring a return time for executing said test job.

7. The method of claim 1, wherein said performing of said trend analysis comprises:
   processing a real job, submitted by a client, by said grid network; and
   measuring said external performance metric of said grid network that is associated with said processing of said test job.

8. The method of claim 1, wherein said internal performance metric is associated with a node and is taken from a group consisting of: throughput, memory capacity, and resource utilization.

9. A method for managing a grid network, comprising:
   automatically processing a plurality of jobs that is associated with a job type in said grid network, wherein said job type is associated with a service level agreement (SLA), wherein said processing of said plurality of jobs comprises:
   processing a client defined test job, associated with said job type, by said grid network, wherein said test job is used for testing performance of said grid network; and
   measuring an external performance metric of said grid network that is associated with said processing of said test job;
   automatically determining a performance history of said grid network in processing said plurality of jobs;
   automatically performing trend analysis to anticipate at least one future load condition for a future load on said grid network associated with said job type;
   automatically measuring at least one internal performance metric of said grid network to monitor current GRID network status; and
   automatically predicting future satisfaction of said SLA by comparing said at least one future load condition that is anticipated and said at least one internal performance metric.

10. The method of claim 9, wherein said processing of said plurality of jobs comprises:
    processing a real job, submitted by a client, by said grid network; and
    measuring said external performance metric of said grid network that is associated with said processing of said test job.

11. The method of claim 9, further comprising:
    determining an action to be automatically performed by said grid network based on whether said SLA is satisfied under said future load.

12. The method of claim 11, further comprising:
    performing said action.

13. A system for managing a grid network, comprising:
    a processor for executing instructions; and
    a computer-readable storage medium with the instructions that the processor executes stored on the computer-readable storage medium, wherein the processor executes the instructions that implement:
    a service level agreement (SLA) manager for performing trend analysis of a job type that is repeatedly processed by said grid network to anticipate at least one future load on said grid network, wherein said SLA manager submits a client defined test job of said job type for processing in said grid network, wherein said test job is used for controlled testing of a performance of said grid network and measures an external performance metric of said grid network that is associated with processing of said test job;
    at least one resource manager for measuring at least one internal performance metric of a node of said grid network to monitor current grid network status; and
    a predictive behavior modeling module for predicting satisfaction of a Service Level Agreement (SLA) by comparing said future load that is anticipated and said at least one internal performance metric.

14. The system of claim 13, further comprising:
    an action analyzer for determining an action, to be automatically performed by said grid network based on whether said SLA is satisfied under said future load.

15. The system of claim 13, wherein said SLA manager monitors processing of a real job, submitted by a client, in said grid network, wherein said job type comprises said real job, and wherein said SLA manager measures an external performance metric of said grid network that is associated with processing of said real job.

16. The system of claim 13, wherein said SLA manager further comprises:
   a profile builder for determining predictable service levels under said at least one future load.

17. The system of claim 13, further comprising:
   a metadata repository for storing results from said trend analysis and said at least one internal performance metric.

* * * * *

UNITED STATES PATENT AND TRADEMARK OFFICE
CERTIFICATE OF CORRECTION

PATENT NO. : 7,672,923 B1  Page 1 of 1
APPLICATION NO. : 11/591082
DATED : March 2, 2010
INVENTOR(S) : David Reed It is certified that error appears in the above-identified patent and that said Letters Patent is hereby corrected as shown below:

In column 7, line 32, in Claim 2, delete "action" and insert -- action, --, therefor.

In column 7, line 33, in Claim 2, delete "network" and insert -- network, --, therefor.

In column 8, line 14, in Claim 9, delete "GRID" and insert -- grid --, therefor.

In column 8, line 30, in Claim 11, delete "action" and insert -- action, --, therefor.

In column 8, line 31, in Claim 11, delete "network" and insert -- network, --, therefor.

In column 8, line 63, in Claim 14, delete "network" and insert -- network, --, therefor.

Signed and Sealed this

Twentieth Day of July, 2010

David J. Kappos
*Director of the United States Patent and Trademark Office*